(12) United States Patent
Tsujiura et al.

(10) Patent No.: US 11,577,434 B2
(45) Date of Patent: Feb. 14, 2023

(54) ROTARY COMPRESSION-MOLDING MACHINE

(71) Applicant: KIKUSUI SEISAKUSHO LTD., Kyoto (JP)

(72) Inventors: Yuji Tsujiura, Kyoto (JP); Yasushi Fujii, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 169 days.

(21) Appl. No.: 17/010,579

(22) Filed: Sep. 2, 2020

(65) Prior Publication Data
US 2021/0078215 A1    Mar. 18, 2021

(30) Foreign Application Priority Data

Sep. 13, 2019  (JP) .............................. JP2019-167028

(51) Int. Cl.
| | |
|---|---|
| B30B 11/08 | (2006.01) |
| B29C 43/36 | (2006.01) |
| B29C 43/02 | (2006.01) |
| B29K 105/00 | (2006.01) |

(52) U.S. Cl.
CPC .......... B29C 43/3607 (2013.01); B29C 43/02 (2013.01); *B29K 2105/0035* (2013.01)

(58) Field of Classification Search
CPC ...... B30B 11/02; B30B 11/08; B30B 15/0082
See application file for complete search history.

(56) References Cited

U.S. PATENT DOCUMENTS

| | | | | |
|---|---|---|---|---|
| 3,392,688 | A | * 7/1968 | Korsch | .................. B30B 11/08 425/107 |
| 4,259,049 | A | * 3/1981 | Willich | ................. B30B 15/026 425/73 |
| 4,793,791 | A | 12/1988 | Kokuryo | |
| 2003/0042639 | A1 | 3/2003 | Christiaens et al. | |

(Continued)

FOREIGN PATENT DOCUMENTS

| | | |
|---|---|---|
| GB | 461826 A | 2/1937 |
| GB | 1 469 890 A | 4/1977 |

(Continued)

OTHER PUBLICATIONS

Extended European Search Report dated Dec. 23, 2020 for European Patent Application No. 20182489.3.

*Primary Examiner* — Matthew J Daniels
(74) *Attorney, Agent, or Firm* — McGinn I.P. Law Group, PLLC.

(57) ABSTRACT

A rotary compression-molding machine includes a lower punch-retaining portion disposed below a table including die bores and retaining a lower punch, and a dust-proofing device including a sealing case supported by the lower punch-retaining portion and including a bottom wall that includes an insertion bore penetrated by the lower punch, faces an upward surface of the lower punch-retaining portion, and includes a dust receiver disposed outside the insertion bore and configured to capture dust, and an outer wall that rises from an outer edge of the bottom wall, has an upper end positioned higher in level than an upward surface of a circumferential edge of the insertion bore, and includes a returning part projecting inward from the upper end or a portion adjacent thereto.

20 Claims, 7 Drawing Sheets

(56) References Cited

U.S. PATENT DOCUMENTS

| | | | |
|---|---|---|---|
| 2004/0191347 A1* | 9/2004 | Boeckx | B30B 15/0023 |
| | | | 425/193 |
| 2004/0207107 A1 | 10/2004 | Christiaens et al. | |
| 2006/0147574 A1* | 7/2006 | Harada | B30B 15/0082 |
| | | | 425/353 |

FOREIGN PATENT DOCUMENTS

| | | |
|---|---|---|
| JP | S49-32879 A | 3/1974 |
| JP | S58-47397 U | 3/1983 |
| JP | H07-009590 U | 2/1995 |
| JP | H08-132297 A | 5/1996 |
| JP | 2006-212702 A | 8/2006 |
| WO | WO 03/020499 A1 | 3/2003 |

* cited by examiner

ROTARY COMPRESSION-MOLDING MACHINE

BACKGROUND

There has been known a rotary compression-molding machine including a table of a turret including die bores, and an upper punch and a lower punch slidably retained above and below each of the die bores, and configured to horizontally rotate the table and the punches together to compression mold (or to make a tablet) a powdery material filled in the die bores to obtain molded products when the paired upper and lower punches pass between an upper roll and a lower roll. The compression-molding machine of this type is applied, for example, to produce pharmaceutical tablets, food products, electronic components, and the like.

The die bores vertically penetrate the table, and each receive a tip of the lower punch from below. It is accordingly inevitable that the powdery material slightly falls from the die bores in the table. The powdery material having fallen may adhere to an outer circumference of a trunk of the lower punch and a retaining bore of a lower punch-retaining portion retaining the trunk of the lower punch. Dust thereof may be mixed with a lubricating oil for the trunk of the lower punch and the retaining bore to aggregate as a foreign matter that may damage an interior of the molding machine.

In view of this, there has been conventionally disposed a sealing case including a sealing member and covering an upward surface of the lower punch-retaining portion and a circumferential edge of the retaining bore for inhibition of an entry of dust to the retaining bore of the lower punch-retaining portion (e.g., see JP 2006-212702 A).

The powdery material, having fallen below the table, falls onto the sealing case covering the lower punch-retaining portion. The sealing case also horizontally rotates along with the lower punch-retaining portion, the punches, and the table. The molding machine recently tends to operate at higher rotational speed in order for improvement in productivity (i.e., the number of produced molded products per unit time.) In accordance with such higher rotational speed of the molding machine, the powdery material fallen onto the sealing case is more likely to scatter around due to a centrifugal force.

SUMMARY OF THE INVENTION

The exemplary invention has been achieved in view of the problem described above, and an exemplary object thereof is to provide a simple structure that inhibits scatter of a powdery material fallen onto a sealing case.

The exemplary invention provides a rotary compression-molding machine including a table including die bores penetrating the table and an upper punch and a lower punch slidably retained above and below each of the die bores, and configured to horizontally rotate the table and the punches to compression mold a powdery material filled in the die bore when the upper punch and the lower punch being paired pass between upper rolls and lower rolls. The rotary compression-molding machine further includes a lower punch-retaining portion disposed below the table, including a retaining bore receiving and retaining the lower punch, and configured to horizontally rotate along with the table and the lower punch, and a dust-proofing device including a sealing case supported by the lower punch-retaining portion and including a bottom wall that has an insertion bore penetrated by the lower punch, faces an upward surface of the lower punch-retaining portion, and includes a dust receiver disposed outside the insertion bore and configured to capture dust, and an outer wall that rises from an outer edge of the bottom wall, has an upper end positioned higher in level than an upward surface of a circumferential edge of the insertion bore, and includes a returning part projecting inward from the upper end or a portion adjacent thereto.

A powdery material is an aggregate of minute solids and conceptually includes an aggregate of particles such as so-called "granules" and an aggregate of powder smaller than such particles. Examples of the powdery material include a powdery material containing a principal agent (i.e., a main ingredient or an active ingredient), an excipient appropriately increasing volume and weight of a molded product, a lubricant preventing the powdery material from adhering to a die bore or a punch, a binder binding particles of the powdery material, starch serving as a disintegrant absorbing moisture to enable easy disintegration of the molded product, and an additive exemplified by a stabilizer stabilizing quality like crystalline cellulose or a carbonate, or a preservative prolonging shelf life. The powdery material according to the exemplary invention also includes a mixture of two or more types of powdery materials, and a mixture of a powdery principal agent and a powdery additive.

The above configuration can cause the high outer wall including the returning part to capture the powdery material fallen onto the sealing case and receiving a large centrifugal force to scatter.

Furthermore, if the dust receiver disposed at the bottom wall of the sealing case is recessed downward from the circumferential edge of the insertion bore, then the powdery material can more reliably be collected in the dust receiver, for inhibition of scatter of the powdery material.

If the bottom wall of the sealing case has a slant surface descending from the circumferential edge of the insertion bore toward the dust receiver, then the powdery material fallen onto the sealing case is likely to fall into the dust receiver.

If the dust-proofing device includes a sealing member disposed inside the insertion bore in the bottom wall of the sealing case and being in contact with an outer circumference of the lower punch, then the powdery material fallen onto the sealing case can more reliably be inhibited from entering the retaining bore of the lower punch-retaining portion.

Lubricating-oil reducing friction is applied between an outer circumference of a trunk of the lower punch and an inner circumference of the retaining bore of the lower punch-retaining portion. Due to the centrifugal force, the lubricating oil may flow outward through a gap between a downward surface of the bottom wall of the sealing case and the upward surface of the lower punch-retaining portion to scatter around. If the sealing case has a vertically downward wall that extends vertically downward from a portion outside an outer edge of the lower punch-retaining portion in a downward surface of the bottom wall, and has a lower end positioned lower in level than the upward surface of the lower punch-retaining portion, then the vertically downward wall inhibits wide scatter of the lubricating oil.

If the lower end of the vertically downward wall of the sealing case has a holding member extending inward, and the bottom wall of the sealing case and the holding member interpose an outer edge of the lower punch-retaining portion, then the sealing case can stably be fixed to the rotating lower punch-retaining portion, as well as the vertically downward wall and the holding member can more reliably inhibit scatter of the lubricating oil.

The exemplary invention further provides a dust-proofing method for a lower punch included in a rotary compression-molding machine including a table including die bores penetrating the table and an upper punch and a lower punch slidably retained above and below each of the die bores, and configured to horizontally rotate the table and the punches to compression mold a powdery material filled in the die bore when the upper punch and the lower punch being paired pass between upper rolls and lower rolls, the method including attaching, to a lower punch-retaining portion disposed below the table, including a retaining bore receiving and retaining the lower punch, and configured to horizontally rotate along with the table and the lower punch, a dust-proofing device including a sealing case supported by the lower punch-retaining portion and including a bottom wall that has an insertion bore penetrated by the lower punch, faces an upward surface of the lower punch-retaining portion, and includes a dust receiver disposed outside the insertion bore and configured to capture dust, and an outer wall that rises from an outer edge of the bottom wall, has an upper end positioned higher in level than an upward surface of a circumferential edge of the insertion bore, and includes a returning part projecting inward from the upper end or a portion adjacent thereto.

The exemplary invention provides a simple structure that appropriately inhibits scatter of a powdery material fallen onto a sealing case for a lower punch in a rotary compression-molding machine.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
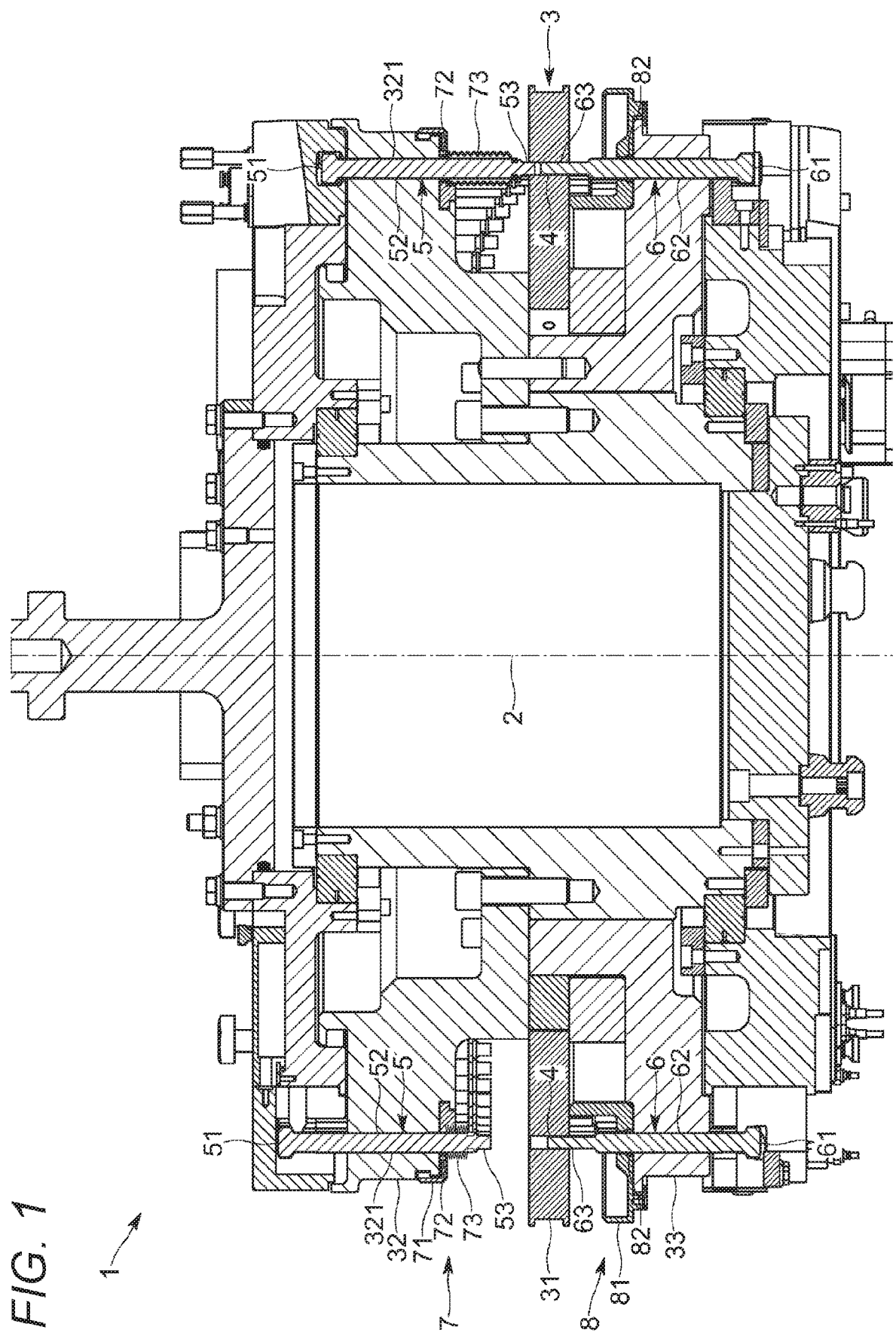
FIG. 1 is a longitudinal sectional view of a main part including a turret in a rotary compression-molding machine according to an exemplary embodiment of the exemplary invention.
Figure 2:
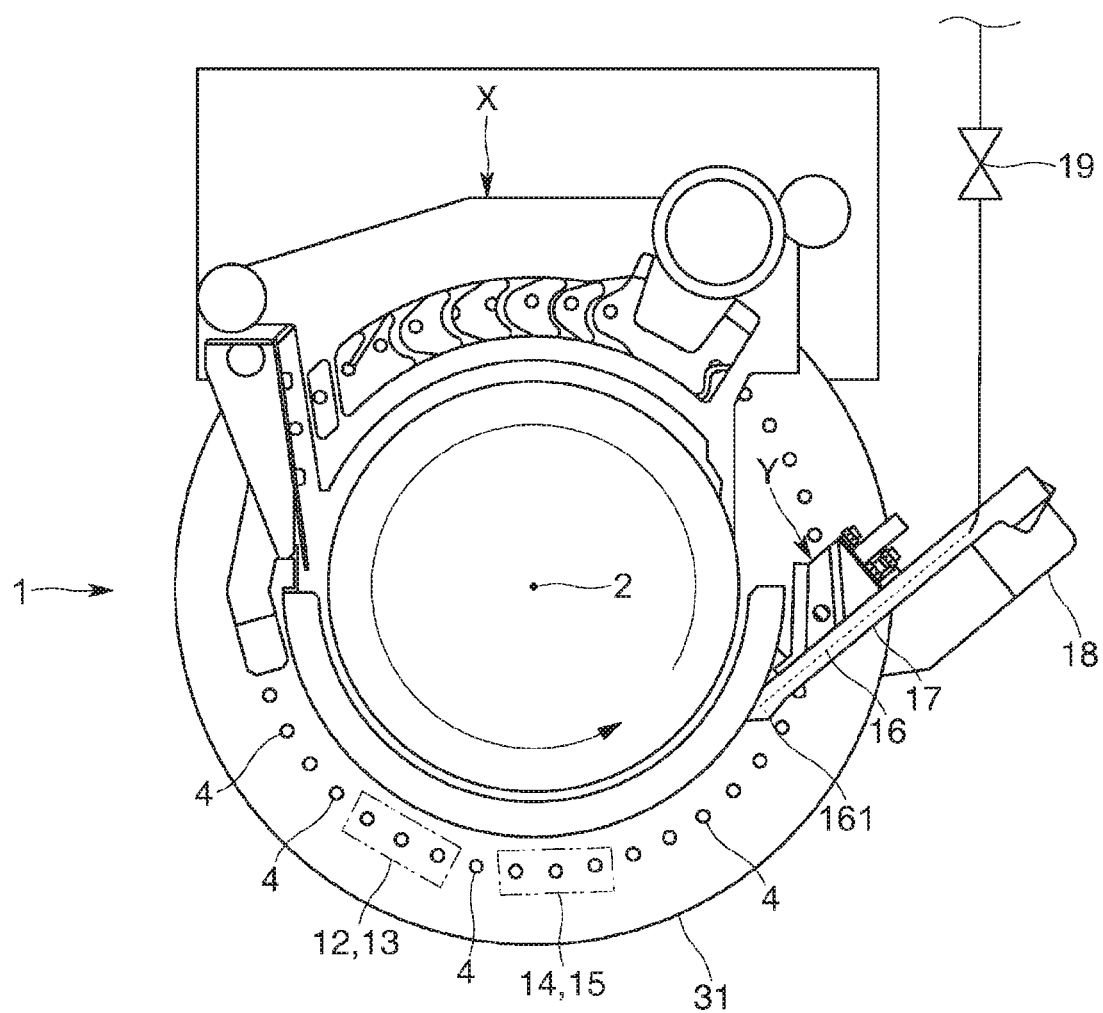
FIG. 2 is a plan view of the rotary compression-molding machine according to the exemplary embodiment.

An exemplary embodiment of the invention will now be described with reference to the drawings. As shown exemplarily in FIGS. 1 to 3, a molding machine 1 according to the exemplary embodiment includes an upper punch 5 and a lower punch 6 vertically and slidably retained above and below a vertically penetrating die bore 4, and is configured to compress a powdery material filled in the die bore 4 by the upper punch 5 and the lower punch 6 to obtain a molded product such as a pharmaceutical tablet. The die bore 4 and the upper and lower punches 5 and 6 constitute a mold for the molded product.

The molding machine 1 includes a frame accommodating an upright shaft serving as a rotary shaft, and a turret 3 fixed to an upper portion of the upright shaft. The turret 3 horizontally rotates about a vertical axis 2 of the upright shaft, more specifically, spins. The turret 3 has a rotation direction indicated by an arrow in FIG. 2. The turret 3 includes a table (e.g., a die disc) 31, an upper punch-retaining portion 32 positioned above the table 31, and a lower punch-retaining portion 33 positioned below the table 31. The table 31 has a disc shape or an annular ring shape in a plan view in an extension direction of a rotary shaft 2 of the turret 3 (i.e., in the vertical direction). The table 31 has a plurality of die bores 4 disposed in an outer circumferential portion and aligned in the rotation direction or a circumferential direction around the axis 2 at predetermined intervals. Each of the die bores 4 vertically penetrates the table 31. The table 31 is alternatively divided into a plurality of plates. Instead of forming the die bores 4 by directly drilling the table 31, the table 31 may alternatively have a plurality of die members that is separate from the table 31 and is detachably attached thereto. In this case, each of the die members alternatively has a die bore 4 penetrating vertically.

The die bores 4 each have a set of the upper punch 5 and the lower punch 6 disposed above and below the corresponding die bore 4. The sets of the upper punches 5 and the lower punches 6 are equal in the number to the die bores 4. The upper punches 5 and the lower punches 6 are retained by the upper punch-retaining portion 32 and the lower punch-retaining portion 33 so as to be independently slidable vertically with respect to the die bores 4. The upper punches 5 each have a tip 53 that enters and exits corresponding one of the die bores 4. The lower punches 6 each have a tip 63 that is kept inserted to corresponding one of the die bores 4. The upper punches 5 and the lower punches 6 horizontally rotate, more specifically, revolve, about the vertical axis 2 along with the turret 3 and the die bores 4.

The upright shaft has a lower end fixing a worm wheel. The worm wheel meshes with a worm gear. The worm gear is fixed to a gear shaft that is driven by a motor. Rotary drive power, outputted from the motor, is transmitted to the gear shaft, so as to drive and rotate the upright shaft, the turret 3, and the punches 5 and 6 by way of the worm gear and the worm wheel.

The powdery material as a constituent material for the molded product is filled in each of the die bores 4 by a feeder X serving as a filling device disposed immediately above the outer circumferential portion of the table 31. As to the feeder X, there are several types including an agitated feeder and a gravity feeder. The feeder X may be of any type in the exemplary invention. The powdery material is fed to the feeder X by a hopper.

A spray device Y is configured to spray an external lubricant toward inner circumferential surfaces of the die bores 4, upper end surfaces of the tips 63 of the lower punches 6, and lower end surfaces of the tips 53 of the upper punches 5. Examples of the lubricant include a wax including a metal stearate (particularly magnesium stearate) or the like, and talc. The lubricant is forcibly electrostatically charged when sprayed from the spray device Y. The die bores 4 and the punches 5 and 6 are each grounded via the turret 3. The electrostatically charged lubricant strongly adheres to the inner circumferential surface of the die bore 4, the upper end surface of the tip 63 of the lower punch 6, and the lower end surface of the tip 53 of the upper punch 5, which are metal surfaces. The lubricant having adhered is not separated by vibration caused by a vertical motion of the punches 5 and 6 or by wind pressure caused by rotation of the turret 3, is pressed strongly against the powdery material simultaneously when the punches 5 and 6 compression mold the powdery material, and is transferred from the die bore 4 and the tips 53 and 63 of the punches 5 and 6 to adhere to the molded product.

A preliminary compression upper roll 12, a preliminary compression lower roll 13, a substantial compression upper roll 14, and a substantial compression lower roll 15 are disposed on orbits of the punches 5 and 6 that horizontally rotate about the axis 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6. The preliminary compression upper roll 12 and the preliminary compression lower roll 13, as well as the substantial compression upper roll 14 and the substantial compression lower roll 15, bias the upper and lower punches 5 and 6 to bring the upper and lower punches 5 and 6 closer to each other, so that end surfaces of the tips 53 and 63 compress from above and below the powdery material filled in each of the die bores 4.

The upper and lower punches 5 and 6 have heads 51 and 61 pressed by the rolls 12, 13, 14, and 15, and trunks 52 and 62 smaller in diameter than the heads 51 and 61, respectively.

The upper punch-retaining portion 32 of the turret 3 has retaining bores 321 disposed in an outer circumferential portion and aligned in the rotation direction at predetermined intervals. The retaining bores 321 are equal in the number to the die bores 4. The retaining bores 321 are positioned just above the die bores 4 drilled in the table 31 and vertically penetrate the upper punch-retaining portion 32. The retaining bores 321 have an inner diameter substantially equal to an outer diameter of the trunks 52 of the upper punches 5. The upper punch-retaining portion 32 vertically and slidably retains the upper punches 5 when the retaining bores 321 receive the trunks 52 of the upper punches 5. The retaining bores 321 each have an inner circumference to which a lubricating oil is applied to reduce friction between the inner circumference of the retaining bore 321 and an outer circumference of the trunk 52 of the upper punch 5.

Similarly, the lower punch-retaining portion 33 of the turret 3 has retaining bores 331 disposed in an outer circumferential portion and aligned in the rotation direction at predetermined intervals. The retaining bores 331 are equal in the number to the die bores 4. The retaining bores 331 are positioned just below the die bores 4 drilled in the table 31 and vertically penetrate the lower punch-retaining portion 33. The retaining bores 331 have an inner diameter substantially equal to an outer diameter of the trunks 62 of the lower punches 6. The lower punch-retaining portion 33 vertically and slidably retains the lower punches 6 when the retaining bores 331 receive the trunks 62 of the lower punches 6. The retaining bore 331 each have an inner circumference to which the lubricating oil is applied to reduce friction between the inner circumference of the retaining bore 331 and an outer circumference of the trunk 62 of the lower punch 6.

The tips 53 and 63 as distal ends of the trunks 52 and 62 of the punches 5 and 6 are thinner than the remaining portions of the punches 5 and 6 so as to be inserted to the die bores 4. The tips 53 and 63 each have an outer diameter substantially equal to an inner diameter of the die bores 4.

The turret 3 and the punches 5 and 6 horizontally rotate to cause the rolls 12, 13, 14, and 15 to come relatively closer to the heads 51 and 61 of the punches 5 and 6, respectively. The rolls 12, 13, 14, and 15 come into contact with the heads 51 and 61 to step thereonto. The rolls 12, 13, 14, and 15 further press the upper punches 5 downward and press the lower punches 6 upward. While the rolls 12, 13, 14, and 15 are in contact with flat surfaces on the heads 51 and 61 of the punches 5 and 6, the punches 5 and 6 keep applying required pressure to the powdery material in the die bores 4.

There is a collecting position for completed-molded products, at a downstream position ahead, in the rotation direction of the turret 3 and the punches 5 and 6, of a portion pressed by the substantial compression upper roll 14 and the substantial compression lower roll 15. The collecting position has a guide member (or a scraper) 17.

Vertical motion of the upper and lower punches 5 and 6 are caused by cam rails R1, R2, R3, R4, R5, and R6. The rails R1 to R6 extend in the rotation direction of the punches 5 and 6, and are engaged with the heads 51 and 61 of the punches 5 and 6 to guide and to vertically move the punches 5 and 6, respectively.

Figure 3:
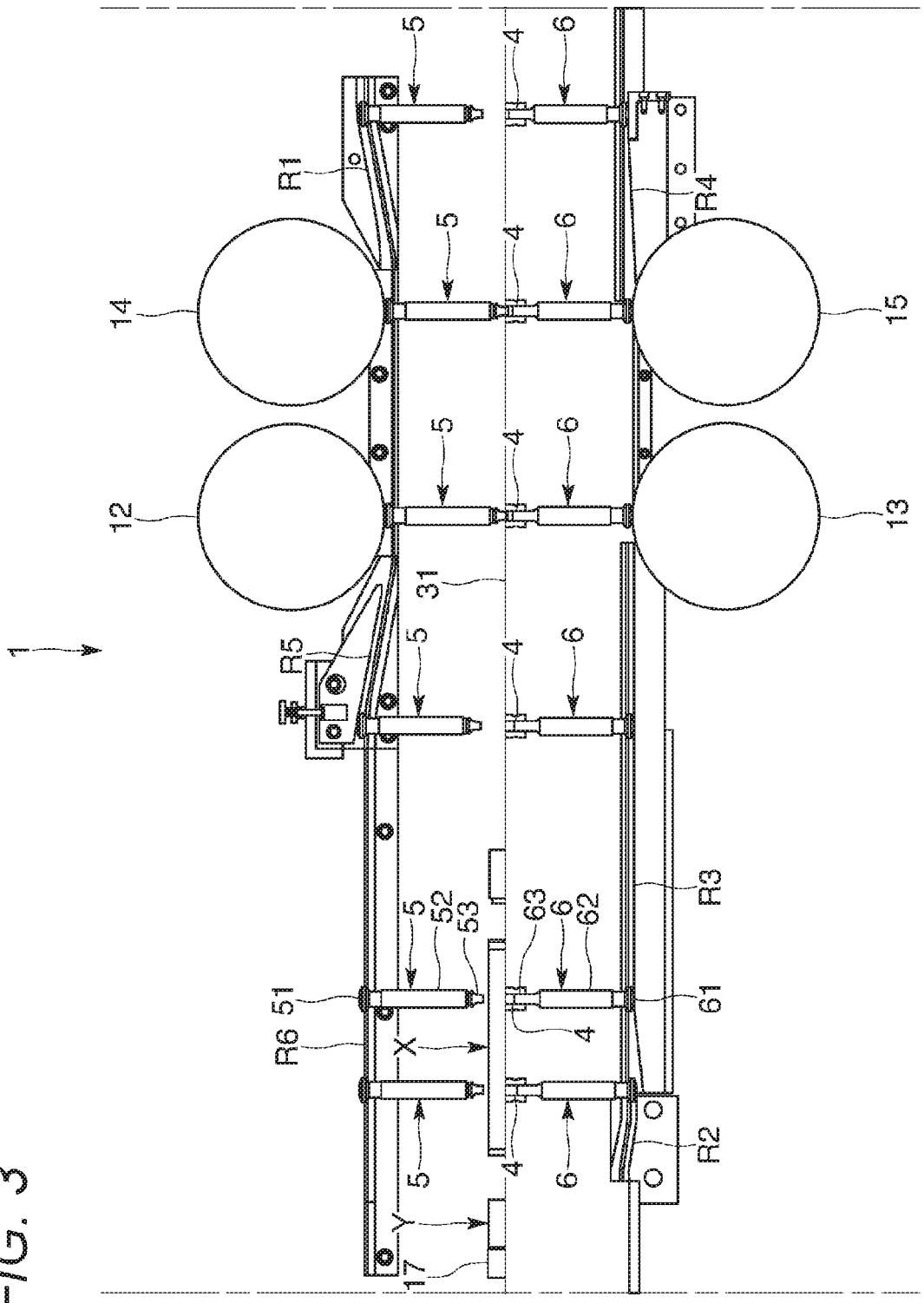
FIG. 3 is a cylindrical view of the rotary compression-molding machine according to the exemplary embodiment.

As shown exemplarily in FIG. 3, the head 51 of each of the upper punches 5 has a revolution orbit including the ascending rail (i.e., ascending cam) R1 configured to lift the upper punch 5 upward at a position upstream of the guide member 17 and extract the tip 53 from the die bore 4, and the descending rail (i.e., descending cam) R5 configured to push the upper punch 5 downward at a position upstream of the rolls 12 and 14 and insert the tip 53 to the die bore 4 to be ready for later compression of the powdery material.

The head 61 of each of the lower punches 6 has a revolution orbit including the push-up rail R4 configured to lift the lower punch 6 upward at a position upstream of the guide member 17 to cause the tip 63 to be substantially as high as an upper surface of the table 31, the lowering unit R2 configured to pull the lower punch 6 downward at a position upstream of or adjacent to the feeder X to set volume of the die bore 4 above the tip 63 to correspond to quantity of the powdery material as the constituent material for the molded product, and the quantity control rail R3 configured to slightly lift the lower punch 6 upward at a position downstream of the feeder X to finely adjust the quantity of the powdery material to be filled in the die bore 4. The quantity control rail R3 has a latter half shaped to slightly pull the lower punch 6 downward to prevent the powdery material having been adjusted in quantity and filled in the die bore 4 from spilling from the die bore 4 due to centripetal force or the like.

A process of producing the molded product will be described briefly. As shown exemplarily in FIG. 3, the lower punch 6 initially descends and the spray device Y sprays the lubricant toward the inner circumferential surface of the die bore 4 to which the tip 63 of the lower punch 6 is inserted, the upper end surface of the tip 63 of the lower punch 6, and the lower end surface of the tip 53 of the upper punch 5. The feeder X fills, with the powdery material, the die bore 4 to which the tip 63 of the lower punch 6 is inserted. The lower punch 6 ascends and the powdery material overflowing the die bore 4 is leveled such that the die bore 4 is filled with required quantity of the powdery material.

The upper punch 5 then descends, and the preliminary compression upper roll 12 and the preliminary compression lower roll 13 press the head 51 of the upper punch 5 and the head 61 of the lower punch 6 such that the tips 53 and 63 of the punches 5 and 6 preliminarily compress the powdery material in the die bore 4. The substantial compression upper roll 14 and the substantial compression lower roll 15 subsequently press the head 51 of the upper punch 5 and the head 61 of the lower punch 6 such that the tips 53 and 63 of the punches 5 and 6 substantially compress the powdery material in the die bore 4.

The lower punch 6 eventually ascends until the upper end surface of the tip 63 of the lower punch 6 ascends to be substantially as high as an upper end of the die bore 4 (i.e. the upper surface of the table 31), and pushes the molded product out of the die bore 4 onto the table 31. The molded product ejected from the die bore 4 is brought into contact with and is scraped by the guide member 17 due to rotation of the turret 3, and shifts along the guide member 17 toward a molded-product chute 18.

The molding machine 1 according to the exemplary embodiment includes a removal mechanism disposed at the collecting position for molded products and configured to select a specific molded product such as a defective product or a sampled product from among the molded products collected at the molded-product chute 18. Specifically, the guide member 17 includes therein a flow passage 16 for compressed air circulation, and the flow passage 16 has a distal end serving as a spray nozzle 161 opened outward in a radial direction perpendicular to the axis 2 of the turret 3. The flow passage 16 and a pump configured to feed the compressed air are connected via a route including a control valve 19 configured to open and close the route. Examples of the control valve 19 include an electromagnetic solenoid configured to open in accordance with a control signal transmitted from a controller or the like.

If the control valve 19 is opened when the specific molded product pushed out of the die bore 4 passes by the spray nozzle 161 before contacting the guide member 17, then the spray nozzle 161 discharges compressed air through the flow passage 16 in the guide member 17. The discharged air blows the specific molded product outward from the table 31. The blown molded product will not reach the molded-product chute 18 ahead of the guide member 17.

Described in detail below are dust-proofing devices 7 and 8 mounted to the punch-retaining portions 32 and 33 in the molding machine 1 according to the exemplary embodiment. The dust-proofing device 7 for the upper punches 5 is configured to inhibit dust generated on the table 31 from adhering to the trunks 52 of the upper punches 5 and entering the retaining bores 321 of the upper punch-retaining portion 32. As shown exemplarily in FIGS. 4 to 6, the dust-proofing device 7 for the upper punches 5 includes a sealing case 71 shielding, from below, the outer circumferential portion of the upper punch-retaining portion 32 and including insertion bores 712 allowing passage of lower portions of the upper punches 5, a sealing member 72 disposed inside each of the insertion bores 712 of the sealing case 71 and being in contact with an outer circumference of the upper punch 5 passing through the insertion bore 712, and a dust cover 73 attached to be in contact with a downward surface of the sealing case 71 to cover a circumferential edge of each of the insertion bores 712 and the outer circumference of the upper punch 5 projecting downward from the insertion bore 712.

The sealing case 71 is made of a metal and includes a bottom wall 711 facing a downward surface of the upper punch-retaining portion 32, and an outer wall 716 rising from an outer edge of the bottom wall 711 and facing an outer surface of the upper punch-retaining portion 32, and is produced by cutting an aluminum alloy or the like.

Figure 6:
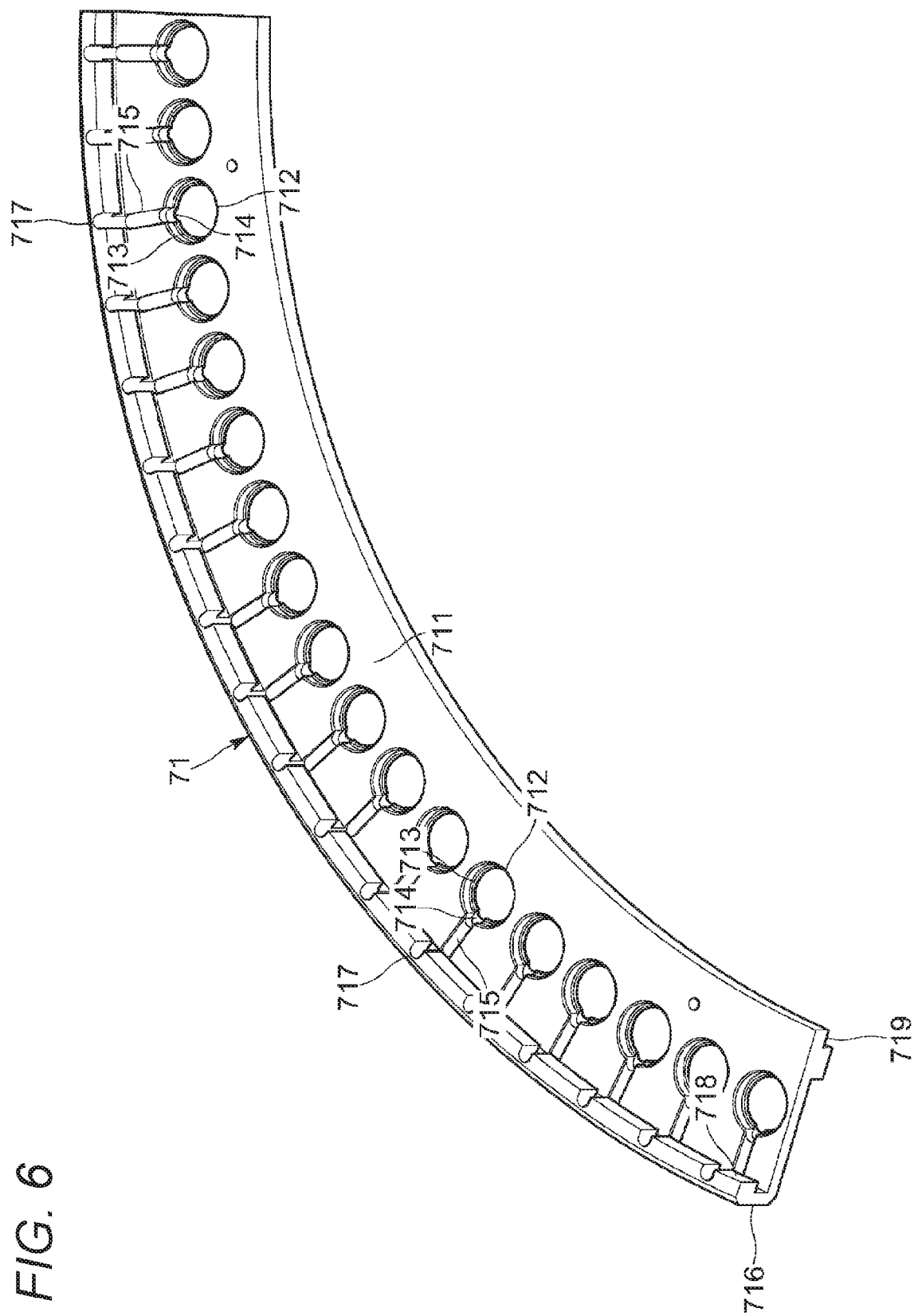
FIG. 6 is a perspective view of a sealing case for an upper punch in the rotary compression-molding machine according to the exemplary embodiment.

As shown exemplarily in FIG. 6, the sealing case 71 is constituted by a plurality of members including a fan shape in a plan view extending in the rotation direction and continuously aligned to surround the rotary shaft 2 of the turret 3 to entirely have an annular ring shape in a plan view so as to entirely cover the outer circumferential portion of the upper punch-retaining portion 32.

The members constituting the sealing case 71 are fixed to the upper punch-retaining portion 32 so as to be supported by the upper punch-retaining portion 32. Specifically, projections 718 and 719, projecting inward, are disposed at an upper end of the outer wall 716 and an inner edge of the bottom wall 711 of the sealing case 71. Meanwhile, the upper punch-retaining portion 32 has, in the outer surface facing the outer wall 716 and the bottom wall 711, annular locking grooves 322 and 323 recessed inward and extending in the rotation direction. With an inner surface of the outer wall 716 being made in contact with the outer surface of the upper punch-retaining portion 32 and an upward surface of the bottom wall 711 being made in contact with the downward surface of the upper punch-retaining portion 32, the projections 718 and 719 are inserted to be engaged with the locking grooves 322 and 323, respectively. In this state, the sealing case 71 is fixed to the upper punch-retaining portion 32 by a fixing tool such as a bolt. The sealing case 71 can be detached from the upper punch-retaining portion 32 by removing the fixing tool.

The bottom wall 711, the outer wall 716, and the projections 718 and 719 are integrally molded in the exemplary embodiment.

The bottom wall 711 of the sealing case 71 has the insertion bores 712 disposed in an outer circumferential portion and aligned in the rotation direction at predetermined intervals. The insertion bores 712 are equal in the number to the die bores 4 and the retaining bores 321. The insertion bores 712 are positioned immediately above the die bores 4 drilled in the table 31 and immediately below the retaining bores 321 drilled in the upper punch-retaining portion 32, and vertically penetrate the bottom wall 711. The insertion bores 712 are slightly larger in inner diameter than the trunks 52 of the upper punches 5. The insertion bores 712 each have an inner circumference that is counter bored.

The sealing member 72 includes an annular base 721 and a lip 723 extending downward and inward from a lower end of the base 721, is elastically deformable, and is entirely made of an elastic material such as a rubber to be molded. The sealing member 72 is engaged with the inner circumference of each of the insertion bores 712 drilled in the bottom wall 711 of the sealing case 71 to be supported by the sealing case 71. Each of the insertion bores 712 is counter bored as described above, and the inner circumference has an upward surface 713 receiving a lower end surface 722 of the base 721 such that the sealing member 72 is attached to the insertion bore 712 in the bottom wall 711 of the sealing case 71. The lip 723 of the sealing member 72 is elastically deformed to come into contact with the outer circumference of the trunk 52 of the upper punch 5 passing through the insertion bore 712. This configuration inhibits an entry of dust from below to above the bottom wall 711 of the sealing case 71, and consequently into the retaining bores 321 of the upper punch-retaining portion 32.

The dust cover 73 has a bellows shape, is elastically deformable, and is entirely made of an elastic material such as a rubber to be molded. The dust cover 73 is attached to cover a region from a lower end of the trunk 52 of each of the upper punches 5 to the downward surface of the sealing case 71. The dust cover 73 includes an engagement piece 731 disposed at a lower end, extending continuously along an entire circumferential edge of the lower end, and projecting inward.

Meanwhile, the lower end of the trunk 52 and the tip 53 of each of the upper punches 5 interpose an annular engagement groove 54 recessed inward and extending continuously to surround the outer circumference of the upper punch 5. The engagement piece 731 is engaged with the engagement groove 54 from outside to latch the lower end of the dust cover 73 to the lower end of the trunk 52 and the tip 53 of the upper punch 5. The dust cover 73 has an upper end in contact with a downward surface of the bottom wall 711 of the sealing case 71. The dust cover 73 expands and contracts in accordance with a vertical motion of the upper punch 5 to cover the circumferential edge of the insertion bore 712 in the downward surface of the bottom wall 711 of the sealing case 71 and the outer circumference of the trunk 52 of the upper punch 5 projecting downward from the insertion bore 712. This configuration inhibits the entry of the dust from below to above the bottom wall 711 of the sealing case 71, and consequently into the retaining bores 321 of the upper punch-retaining portion 32.

The exemplary embodiment provides air passages 714, 715, and 717, disposed between the sealing case 71 and the upper punch-retaining portion 32, for air circulation between an internal space of the expanding and contracting dust cover 73 and the outside.

Specifically, as shown exemplarily in FIG. 6, the inner circumference of each of the insertion bores 712 in the bottom wall 711 of the sealing case 71 partially has the cut-away part 714 recessed outward to be away from the sealing member 72 and the outer circumference of the trunk 52 of the upper punch 5. As shown exemplarily in FIGS. 4 and 5, the cut-away part 714 is positioned outside the sealing member 72 to allow the internal space of the dust cover 73 positioned below the bottom wall 711 to communicate with above the bottom wall 711.

The upward surface of the bottom wall 711 of the sealing case 71 has the groove 715 recessed downward to be away from the downward surface of the upper punch-retaining portion 32. The groove 715 extends outward from a position of the cut-away part 714 in the inner circumference of the insertion bore 712, and has a terminal end reaching the inner surface of the outer wall 716 of the sealing case 71.

Furthermore, the inner surface of the outer wall 716 of the sealing case 71 has the groove 717 recessed outward to be away from the outer surface of the upper punch-retaining portion 32. The groove 717 extends upward from a position of the terminal end of the groove 715 in the bottom wall 711, and is opened to an upper end surface of the outer wall 716.

The cut-away part 714, the groove 715, and the groove 717 are disposed to open passages allowing air to flow between the sealing case 71 attached to the upper punch-retaining portion 32 and the upper punch-retaining portion 32.

Figure 4:
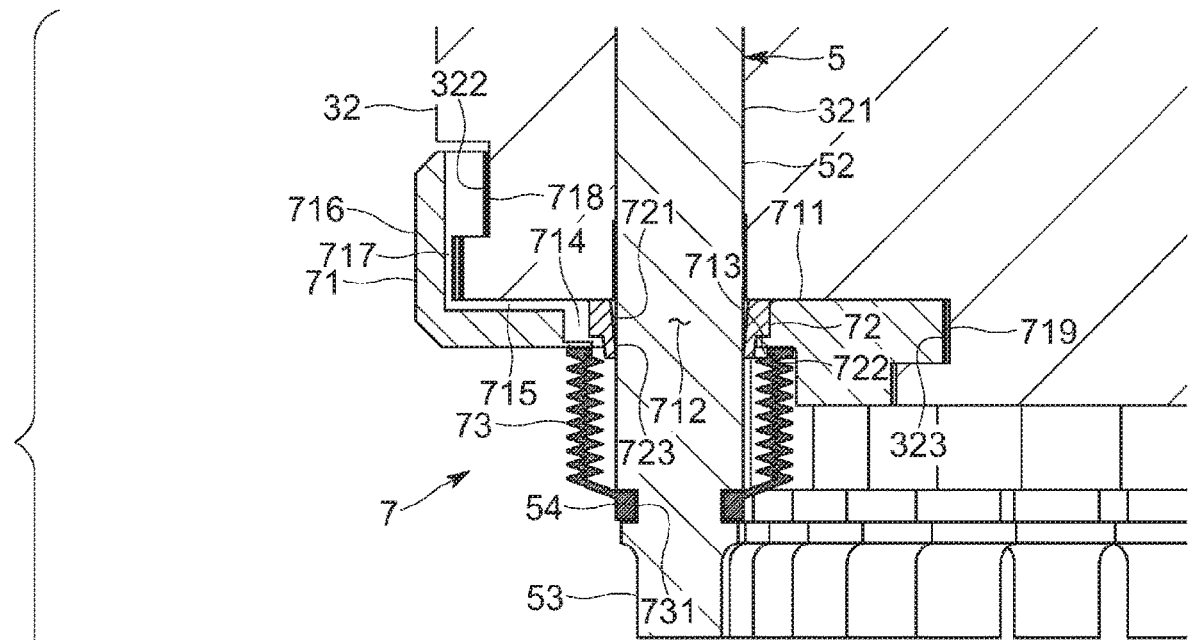
FIG. 4 is an enlarged longitudinal sectional view of a table, an upper punch-retaining portion, a lower punch-retaining portion, and a dust-proofing device included in the rotary compression-molding machine according to the exemplary embodiment.
Figure 4:
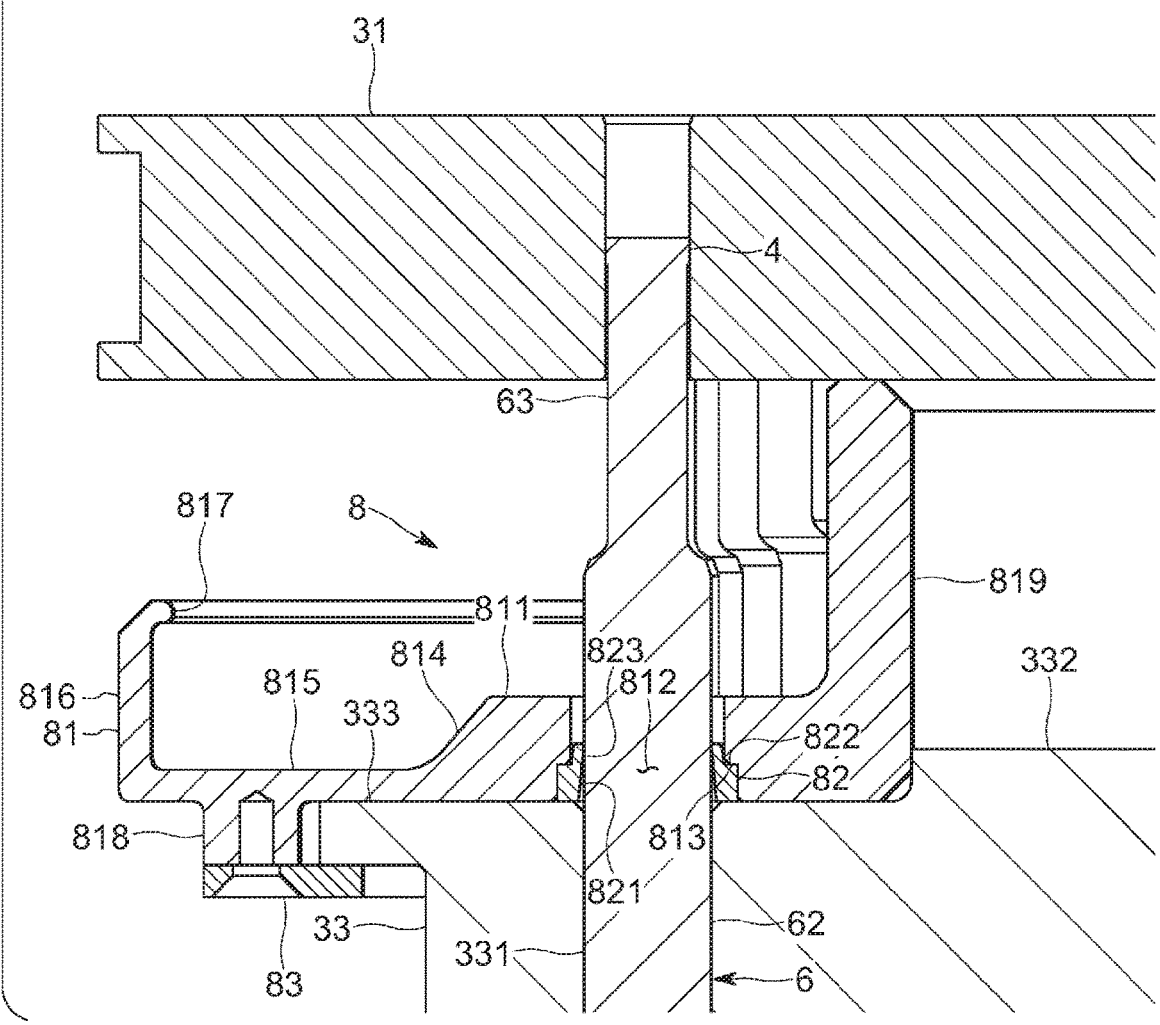

As shown exemplarily in FIG. 4, the dust cover 73, which has the lower end engaged with the engagement groove 54 in each of the upper punches 5 and the upper end in contact with the downward surface of the bottom wall 711 of the sealing case 71, is compressed to be decreased in volume of the internal space in the case, where the upper punch 5 ascends. Air pushed out of the internal space of the dust cover 73 is accordingly emitted to the outside through the air passages, namely, the cut-away part 714, the groove 715, and the groove 717.

Figure 5:
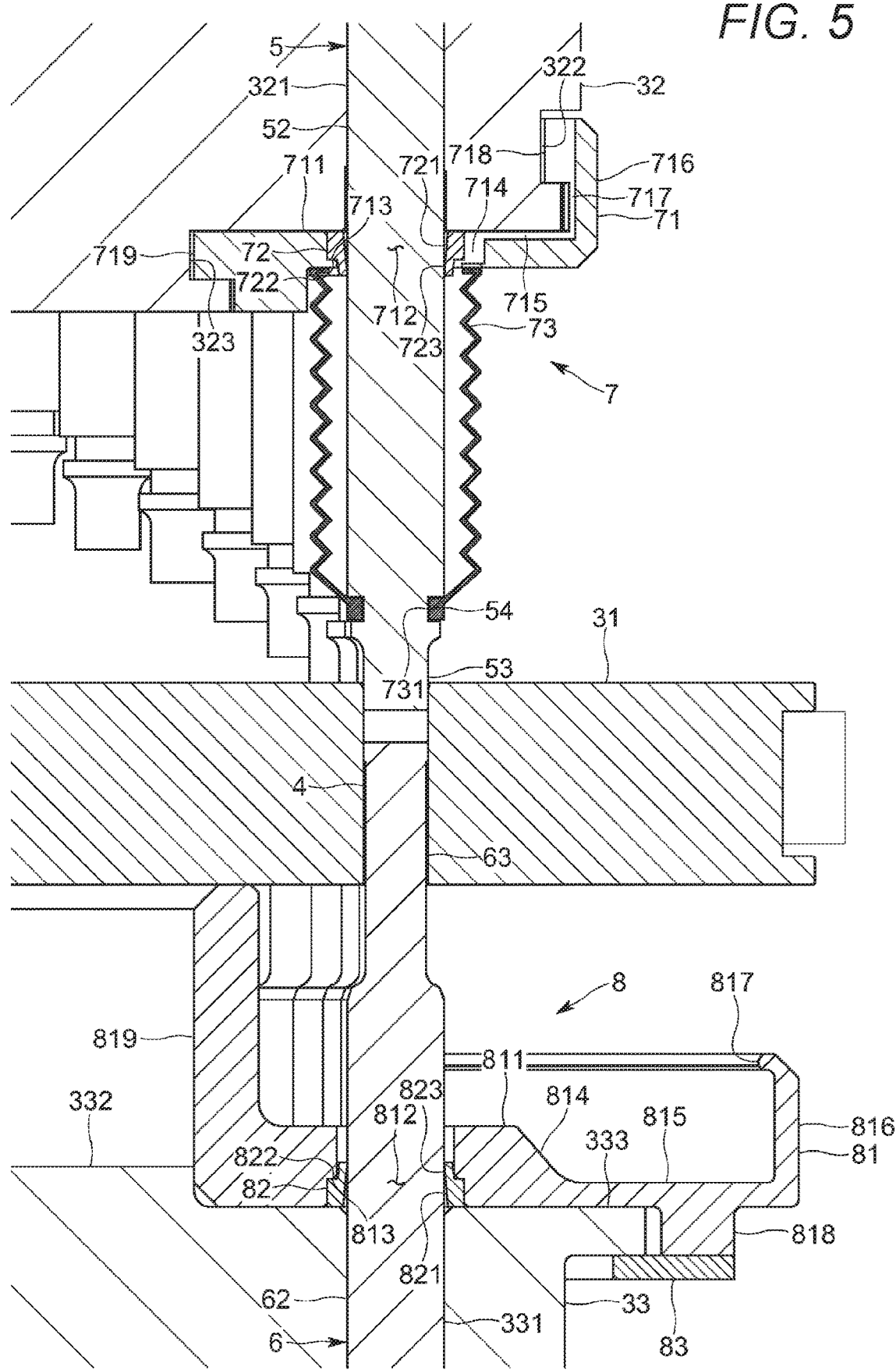
FIG. 5 is another enlarged longitudinal sectional view of the table, the upper punch-retaining portion, the lower punch-retaining portion, and the dust-proofing device included in the rotary compression-molding machine according to the exemplary embodiment.

As shown exemplarily in FIG. 5, in the other case, where the upper punch 5 descends, the dust cover 73 expands to be increased in volume of the internal space. Outside air is accordingly sucked into the internal space of the dust cover 73 through the air passages, namely, the groove 717, the groove 715, and the cut-away part 714.

The air passages 714, 715, and 717 have ports opened upward in the locking groove 322 of the upper punch-retaining portion 32 facing the upper end surface of the outer wall 716 of the sealing case 71. These air ports are away from the table 31 having dust. Dust is thus unlikely to be sucked into the internal space of the dust cover 73 through the air passages 714, 715, and 717.

The dust-proofing device 8 for the lower punches 6 is configured to inhibit dust falling below the table 31 through the die bores 4 from adhering to the trunks 62 of the lower punches 6 and entering the retaining bores 331 of the lower punch-retaining portion 33. As shown exemplarily in FIGS. 4, 5, and 7, the dust-proofing device 8 for the lower punches 6 includes a sealing case 81 shielding, from above, the outer circumferential portion of the lower punch-retaining portion 33 and including insertion bores 812 allowing passage of upper portions of the lower punches 6, and a sealing member 82 disposed inside each of the insertion bores 812 of the sealing case 81 and being in contact with an outer circumference of the lower punch 6 passing through the insertion bore 812.

The sealing case 81 is made of a metal and includes a bottom wall 811 facing an upward surface of the lower punch-retaining portion 33, an outer wall 816 rising from an outer edge of the bottom wall 811, a vertically downward wall 818 extending vertically downward from a portion displaced slightly inward from the outer edge of the bottom wall 811, and an inner wall 819 rising from an inner edge of the bottom wall 811, and is produced by cutting an aluminum alloy or the like. As shown exemplarily in FIG. 7, the sealing case 81 is constituted by a plurality of members including a fan shape in a plan view extending in the rotation direction and continuously aligned to surround the rotary shaft 2 of the turret 3 to entirely have an annular ring shape in a plan view so as to entirely cover the outer circumferential portion of the lower punch-retaining portion 33.

The members constituting the sealing case 81 are fixed to the lower punch-retaining portion 33 so as to be supported by the lower punch-retaining portion 33. Specifically, a corner where a downward surface of the bottom wall 811 of the sealing case 81 and an inner surface of the inner wall 819 cross each other is made in contact with a corner where an upward surface of the outer circumferential portion of the lower punch-retaining portion 33 and an outer surface of a stepped part 332 located inside and higher in level than the upward surface of the outer circumferential portion. Furthermore, a holding member 83 extending inward with respect to an inner surface of the vertically downward wall 818 is firmly fixed to a lower end of the vertically downward wall 818 extending vertically downward from a portion outside an outer edge 333 of the lower punch-retaining portion 33 in the downward surface of the bottom wall 811 of the sealing case 81. The holding member 83 is a metal plate including an arc shape in a plan view, and is made of stainless steel or the like. The outer edge 333 projecting outward from an outer surface of the lower punch-retaining portion 33 is sandwiched between a downward surface of an outer circumferential portion of the bottom wall 811 and an upward surface of the holding member 83, and the sealing case 81 is fixed to the lower punch-retaining portion 33 in this state by a fixing tool such as a bolt. The sealing case 81 can be detached from the lower punch-retaining portion 33 by removing the fixing tool.

The bottom wall 811, the outer wall 816, the vertically downward wall 818, and the inner wall 819 are integrally molded in the exemplary embodiment. The holding member 83 is prepared separately from the sealing case 81.

The bottom wall 811 of the sealing case 81 has the insertion bores 812 disposed in the outer circumferential portion and aligned in the rotation direction at predetermined intervals. The insertion bores 812 are equal in the number to the die bores 4 and the retaining bores 331. The insertion bores 812 are positioned just below the die bores 4 drilled in the table 31 and immediately above the retaining bores 331 drilled in the lower punch-retaining portion 33, and vertically penetrate the bottom wall 811. The insertion bores 812 are slightly larger in inner diameter than the trunks 62 of the lower punches 6. The insertion bores 812 each have an inner circumference that is counter bored. The insertion bores 712 of the sealing case 71 in the dust-proofing device 7 for the upper punches 5 are counter bored upward, whereas the insertion bores 812 of the sealing case 81 in the dust-proofing device 8 for the lower punches 6 are counter bored exactly oppositely (i.e., downward).

The sealing member 82 includes an annular base 821 and a lip 823, extending upward and inward from an upper end of the base 821, is elastically deformable, and is entirely made of an elastic material such as a rubber to be molded. The sealing member 82 is engaged with the inner circumference of each of the insertion bores 812 drilled in the bottom wall 811 of the sealing case 81 to be supported by the sealing case 81 and the lower punch-retaining portion 33. Each of the insertion bores 812 is counter bored as described above, and the inner circumference has a downward surface 813 in contact with an upper end surface 822 of the base 821 that is mounted on an upward surface of a circumferential edge of each of the retaining bores 331 of the lower punch-retaining portion 33. The sealing member 82 can thus be attached to the insertion bore 812 in the bottom wall 811 of the sealing case 81. The lip 823 of the sealing member 82 is elastically deformed to come into contact with the outer circumference of the trunk 62 of the lower punch 6 passing through the insertion bore 812. This configuration inhibits an entry of dust from above to below the bottom wall 811 of the sealing case 81, and consequently into the retaining bores 331 of the lower punch-retaining portion 33.

In order to collect dust falling from the die bores 4 of the table 31 onto the sealing case 81, the exemplary embodiment provides a dust receiver 815 including a recessed groove shape and interposed between the insertion bores 812 in an upward surface of the bottom wall 811 and the outer wall 816 of the sealing case 81.

Figure 7:
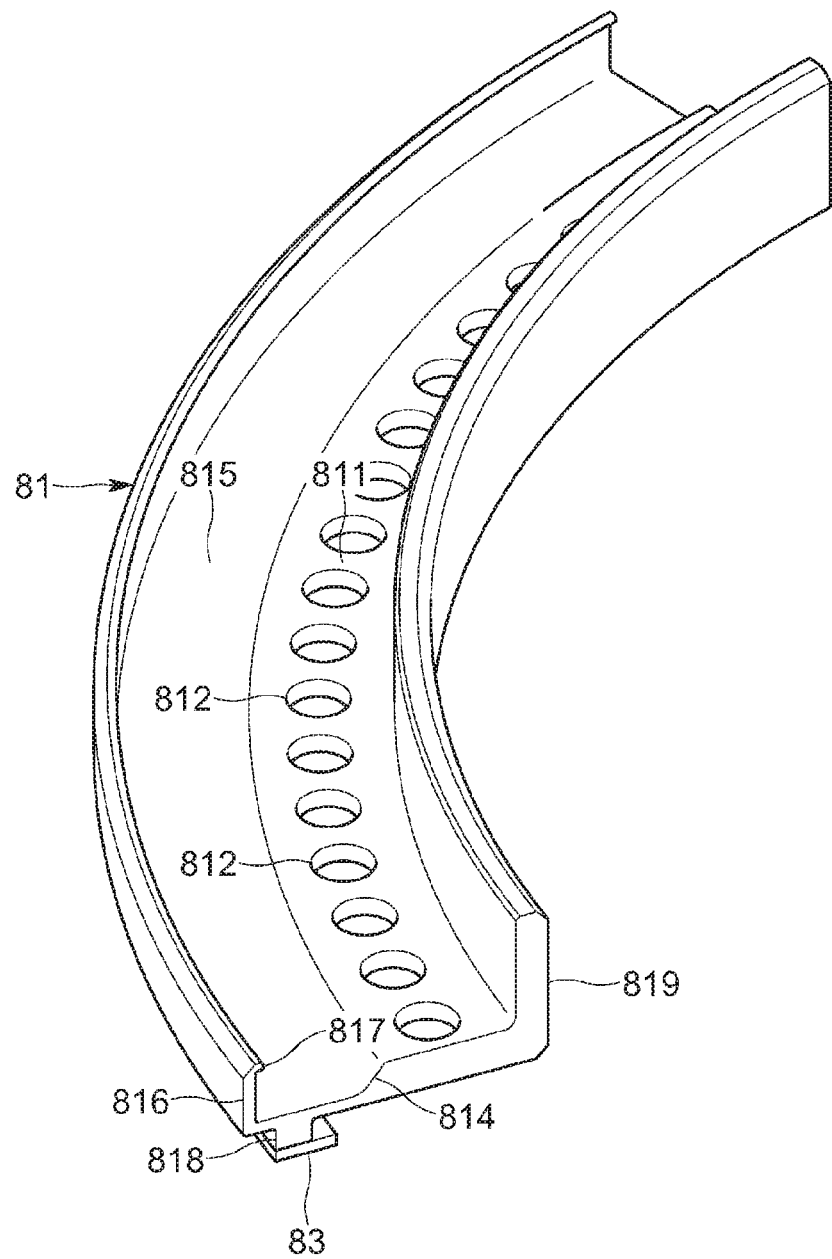
FIG. 7 is a perspective view of a sealing case for a lower punch in the rotary compression-molding machine according to the exemplary embodiment.

As shown exemplarily in FIGS. 4, 5, and 7, the dust receiver 815 constitutes a bottomed groove including a relatively large width and a shallow bottom, extending to have an arc shape in a plan view, and located outside circumferential edges of the insertion bores 812. The bottom of the dust receiver 815 has an upward surface lower in level than the upward surface of the bottom wall 811 including the circumferential edges of the insertion bores 812 (and excluding the dust receiver 815). Furthermore, the upward surface of the bottom wall 811 includes a slant surface 814 descending from the circumferential edges of the insertion bores 812 toward the dust receiver 815.

The outer wall 816 of the sealing case 81 has an upper end positioned higher in level than the upward surface of the bottom wall 811 excluding the dust receiver 815. The upper end of the outer wall 816 or a portion adjacent thereto includes a returning part 817 projecting inward from an inner surface of the outer wall 816. The outer wall 816 and the returning part 817 each extend entirely circumferentially in the rotation direction to have an annular ring shape in a plan view and surround the bottom wall 811 of the sealing case 81. Dust fallen from the die bores 4 of the table 31 onto the sealing case 81 is likely to shift outward to be away from the rotary shaft 2 due to a centrifugal force caused by rotation of the lower punch-retaining portion 33 of the turret 3 and the sealing case 81 fixed thereto. The dust slides along the slant surface 814 to fall into the dust receiver 815 and be captured therein. In the exemplary embodiment, the outer wall 816 of the sealing case 81 is higher in level than the upward surface of the bottom wall 811 and includes the returning part 817, so that dust is significantly less likely to scatter outward from the sealing case 81.

The inner wall 819 of the sealing case 81 has an upper end positioned higher in level than the upper end of the outer wall 816. The inner wall 819 has an upper end surface in contact with or extremely close to a downward surface of the table 31.

The vertically downward wall 818, extending vertically downward from the bottom wall 811 of the sealing case 81, shields, from outside, a gap between the downward surface of the bottom wall 811 and the upward surface of the lower punch-retaining portion 33. The lubricating oil applied into the retaining bores 331 of the lower punch-retaining portion 33 may flow outward through the gap between the downward surface of the bottom wall 811 and the upward surface of the lower punch-retaining portion 33 due to centrifugal force caused by rotation of the lower punch-retaining portion 33 of the turret 3 and the sealing case 81. The vertically downward wall 818 thus disposed inhibits wide scatter of the lubricating oil in the molding machine 1. The holding member 83 attached to the lower end of the vertically downward wall 818 also contributes to prevention of scatter of the lubricating oil.

The exemplary embodiment provides a rotary compression-molding machine 1 including a table 31 including die bores 4 penetrating the table and an upper punch 5 and a lower punch 6 slidably retained above and below each of the die bores 4, and configured to horizontally rotate the table 31 and the punches 5 and 6 to compression mold a powdery material filled in the die bore 4 when the upper punch 5 and the lower punch 6 being paired pass between upper rolls 12 and 14 and lower rolls 13 and 15. The rotary compression-molding machine further includes an upper punch-retaining portion 32 disposed above the table 31 and including a retaining bore 321 receiving and retaining the upper punch 5, and configured to horizontally rotate along with the table 31 and the upper punch 5, a dust-proofing device 7 including a sealing case 71 including a bottom wall 711 that has an insertion bore 712 penetrated by the upper punch 5 and faces a downward surface of the upper punch-retaining portion 32, and an outer wall 716 rising from an outer edge of the bottom wall 711 and facing an outer surface of the upper punch-retaining portion 32, and supported by the upper punch-retaining portion 32, and an expandable dust cover 73 attached to be in contact with a downward surface of the bottom wall 711 of the sealing case 71 and covering a circumferential edge of the insertion bore 712 and an outer circumference of the upper punch 5 projecting downward from the bottom wall 711 through the insertion bore 712, and air passages 714, 715, and 717 disposed between the outer wall 716 of the sealing case 71 and the outer surface of the upper punch-retaining portion 32 as well as between the bottom wall 711 of the sealing case 71 and the downward surface of the upper punch-retaining portion 32 and communicating with an internal space of the dust cover 73 expanding or contracting in accordance with the vertical motion of the upper punch 5.

The exemplary embodiment provides the dust-proofing device 7 configured to appropriately inhibit dust from adhering to the trunk 52 of the upper punch 5 and the retaining bore 321 in the upper punch-retaining portion 32. Furthermore, the air passages 714, 715, and 717, allowing the internal space of the dust cover 73 to communicate with the outside, are opened upward to be away from the table 31 having dust. This configuration significantly reduces dust sucked into the internal space of the dust cover 73 through the air passages 714, 715, and 717.

The sealing case 71 is detachably attached to the upper punch-retaining portion 32. When the sealing case 71 is detached from the upper punch-retaining portion 32, the air passages 714, 715, and 717 can be cleaned easily. The air passages 714, 715, and 717 can thus be prevented from being plugged with dust or a foreign matter containing the dust.

In the exemplary embodiment, the outer wall 716 of the sealing case 71 has an inner surface facing the outer surface of the upper punch-retaining portion 32 and including a groove 717 recessed outward to be away from the outer surface of the upper punch-retaining portion 32 and constituting part of the air passages. The bottom wall 711 of the sealing case 71 has an upward surface facing the downward surface of the upper punch-retaining portion 32 and including a groove 715 recessed downward to be away from the downward surface of the upper punch-retaining portion 32 and constituting part of the air passages. The insertion bore 712 in the bottom wall 711 of the sealing case 71 has an inner circumference including a cut-away part 714 recessed outward to be away from the outer circumference of the upper punch 5 and constituting part of the air passages. Such configurations allow the internal space of the dust cover 73 to reliably communicate with the outside through the air passages 714, 715, and 717 for smooth air circulation between the internal space of the dust cover 73 and the outside.

These configurations need processing only the elements of the sealing case 71, without processing the upper punch-retaining portion 32, and can be obtained at a low cost. The air passage 714, 715, and 717 can be more easily formed between the sealing case 71 and the upper punch-retaining portion 32 in comparison to drilling an elongated breathing bore in the upper punch-retaining portion 32 or the upper punch 5.

The dust-proofing device 7 includes a sealing member 72 disposed inside the insertion bore 712 in the bottom wall 711 of the sealing case 71 and being in contact with the outer circumference of the upper punch 5, and the cut-away part 714, disposed in the inner circumference of the insertion bore 712 in the bottom wall 711 of the sealing case 71, is positioned outside the sealing member 72. There is thus no need to process the sealing member 72 itself to form the cut-away part 714. This configuration does not deteriorate properties or durability of the sealing member 72, and more reliably prevents dust from adhering to the outer circumference of the upper punch 5 or the inner circumference of the retaining bore 321 in the upper punch-retaining portion 32.

The groove 715 constituting part of the air passages is disposed in the upward surface of the bottom wall 711 of the sealing case 71 in the exemplary embodiment. Instead of or in addition to the groove 715, the downward surface of the upper punch-retaining portion 32, facing the bottom wall 711 of the sealing case 71, may have a groove recessed upward and constituting part of the air passages.

The groove 717 constituting part of the air passages is disposed in the inner surface of the outer wall 716 of the sealing case 71 in the above exemplary embodiment. Instead of or in addition to the groove 717, the outer surface of the upper punch-retaining portion 32, facing the outer wall 716 of the sealing case 71, may have a groove recessed inward and constituting part of the air passages.

Furthermore, the exemplary embodiment provides a rotary compression-molding machine 1 including a table 31 including die bores 4 penetrating the table and an upper punch 5 and a lower punch 6 slidably retained above and below each of the die bores 4, and configured to horizontally rotate the table 31 and the punches 5 and 6 to compression mold a powdery material filled in the die bore 4 when the upper punch 5 and the lower punch 6 being paired pass between upper rolls 12 and 14 and lower rolls 13 and 15. The rotary compression-molding machine further includes a lower punch-retaining portion 33 disposed below the table 31, including a retaining bore 331 receiving and retaining the lower punch 6, and configured to horizontally rotate along with the table 31 and the lower punch 6, and a dust-proofing device 8 including a sealing case 81 supported by the lower punch-retaining portion 33 and including a bottom wall 811 that has an insertion bore 812 penetrated by the lower punch 6, faces an upward surface of the lower punch-retaining portion 33, and includes a dust receiver 815 disposed outside the insertion bore 812 and configured to capture dust, and an outer wall 816 that rises from an outer edge of the bottom wall 811, has an upper end positioned higher in level than an upward surface of a circumferential edge of the insertion bore 812, and includes a returning part 817 projecting inward from the upper end or a portion adjacent thereto.

According to the exemplary embodiment, the high outer wall 816 including the returning part 817 can capture the powdery material fallen onto the sealing case 81 for the lower punch 6 in the molding machine 1 and receiving large centrifugal force to scatter. The exemplary embodiment thus achieves a simple structure that appropriately inhibits scatter of the powdery material fallen onto the sealing case 81.

Furthermore, the dust receiver 815 disposed at the bottom wall 811 of the sealing case 81 is recessed downward from the circumferential edge of the insertion bore 812, so that the powdery material can more reliably be collected in the dust receiver 815, for inhibition of scatter of the powdery material.

The bottom wall 811 of the sealing case 81 has a slant surface 814 descending from the circumferential edge of the insertion bore 812 toward the dust receiver 815, so that the powdery material fallen onto the sealing case 81 is likely to fall into the dust receiver 815.

The dust-proofing device 8 includes a sealing member 82 disposed inside the insertion bore 812 in the bottom wall 811 of the sealing case 81 and being in contact with an outer circumference of the lower punch 6, so that the powdery material fallen onto the sealing case 81 can more reliably be inhibited from entering the retaining bore 331 of the lower punch-retaining portion 33.

Lubricating-oil reducing friction is applied between an outer circumference of a trunk 62 of the lower punch 6 and an inner circumference of the retaining bore 331 of the lower punch-retaining portion 33. The lubricating oil may flow outward through a gap between a downward surface of the bottom wall 811 of the sealing case 81 and the upward surface of the lower punch-retaining portion 33 to scatter around. The sealing case 81 has a vertically downward wall 818 that extends vertically downward from a portion outside an outer edge of the lower punch-retaining portion 33 in a downward surface of the bottom wall 811, and has a lower end positioned lower in level than the upward surface of the lower punch-retaining portion 33, so that the vertically downward wall 818 inhibits wide scatter of the lubricating oil.

Furthermore, the lower end of the vertically downward wall 818 of the sealing case 81 has a holding member 83 extending inward, and the bottom wall 811 of the sealing case 81 and the holding member 83 interpose an outer edge 333 of the lower punch-retaining portion 33, so that the sealing case 81 can stably be positioned and fixed to the rotating lower punch-retaining portion 33, as well as the vertically downward wall 818 and the holding member 83 can more reliably inhibit scatter of the lubricating oil.

The exemplary invention is not limited to the exemplary embodiment detailed above. Specific configurations of respective parts can be modified in various manners within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A rotary compression-molding machine, comprising:
   a table including die bores penetrating the table and an upper punch and a lower punch slidably retained above and below each of the die bores, and configured to horizontally rotate the table and the punches to compression mold a powdery material filled in the die bores when the upper punch and the lower punch being paired pass between upper rolls and lower rolls;
   a lower punch-retaining portion disposed below the table, including a retaining bore receiving and retaining the lower punch, and configured to horizontally rotate along with the table and the lower punch; and
   a dust-proofing device comprising a sealing case supported by the lower punch-retaining portion and including a bottom wall that includes an insertion bore penetrated by the lower punch, faces an upward surface of the lower punch-retaining portion, and includes a dust receiver disposed outside the insertion bore and configured to capture dust, and an outer wall that rises from an outer edge of the bottom wall, has an upper end positioned higher in level than an upward surface of a circumferential edge of the insertion bore, and includes a returning part projecting inward from the upper end or a portion adjacent thereto.

2. The rotary compression-molding machine according to claim 1, wherein the dust receiver, disposed at the bottom wall of the sealing case, is recessed downward from the circumferential edge of the insertion bore,
   wherein the dust receiver with the outer wall and returning part is configured to collect the powdery material and inhibit scatter of the powdery material.

3. The rotary compression-molding machine according to claim 2, wherein the dust-proofing device includes a sealing member disposed inside the insertion bore in the bottom wall of the sealing case and being in contact with an outer circumference of the lower punch, and
   wherein sealing case includes a vertically downward wall that extends vertically downward from a portion outside an outer edge of the lower punch-retaining portion in a downward surface of the bottom wall, and includes a lower end positioned lower in a level than the upward surface of the lower punch-retaining portion.

4. The rotary compression-molding machine according to claim 3, wherein the sealing case includes a vertically downward wall that extends vertically downward from a portion outside an outer edge of the lower punch-retaining portion in a downward surface of the bottom wall, and has a lower end positioned lower in level than the upward surface of the lower punch-retaining portion.

5. The rotary compression-molding machine according to claim 4, wherein the lower end of the vertically downward wall of the sealing case includes a holding member extending inward, and
   wherein the bottom wall of the sealing case and the holding member interpose an outer edge of the lower punch-retaining portion.

6. The rotary compression-molding machine according to claim 2, wherein the sealing case includes a vertically downward wall that extends vertically downward from a portion outside an outer edge of the lower punch-retaining portion in a downward surface of the bottom wall, and has a lower end positioned lower in level than the upward surface of the lower punch-retaining portion.

7. The rotary compression-molding machine according to claim 6, wherein the lower end of the vertically downward wall of the sealing case includes a holding member extending inward, and
   wherein the bottom wall of the sealing case and the holding member interpose an outer edge of the lower punch-retaining portion.

8. The rotary compression-molding machine according to claim 2, wherein the bottom wall of the sealing case includes a slant surface descending from the circumferential edge of the insertion bore toward the dust receiver, and
   wherein the outer wall including the returning part captures the powdery material fallen onto the sealing case for the lower punch to inhibit scatter of the powdery material fallen onto the sealing case.

9. The rotary compression-molding machine according to claim 8, wherein the dust-proofing device includes a sealing member disposed inside the insertion bore in the bottom wall of the sealing case and being in contact with an outer circumference of the lower punch.

10. The rotary compression-molding machine according to claim 9, wherein the sealing case includes a vertically downward wall that extends vertically downward from a portion outside an outer edge of the lower punch-retaining portion in a downward surface of the bottom wall, and has a lower end positioned lower in level than the upward surface of the lower punch-retaining portion.

11. The rotary compression-molding machine according to claim 10, wherein the lower end of the vertically downward wall of the sealing case includes a holding member extending inward, and
 wherein the bottom wall of the sealing case and the holding member interpose an outer edge of the lower punch-retaining portion.

12. The rotary compression-molding machine according to claim 8, wherein the sealing case includes a vertically downward wall that extends vertically downward from a portion outside an outer edge of the lower punch-retaining portion in a downward surface of the bottom wall, and has a lower end positioned lower in level than the upward surface of the lower punch-retaining portion.

13. The rotary compression-molding machine according to claim 12, wherein the lower end of the vertically downward wall of the sealing case includes a holding member extending inward, and
 wherein the bottom wall of the sealing case and the holding member interpose an outer edge of the lower punch-retaining portion.

14. The rotary compression-molding machine according to claim 1, wherein the dust-proofing device includes a sealing member disposed inside the insertion bore in the bottom wall of the sealing case and being in contact with an outer circumference of the lower punch, and
 wherein the dust proofing device does not extend beyond the table.

15. The rotary compression-molding machine according to claim 14, wherein the sealing case includes a vertically downward wall that extends vertically downward from a portion outside an outer edge of the lower punch-retaining portion in a downward surface of the bottom wall, and has a lower end positioned lower in level than the upward surface of the lower punch-retaining portion.

16. The rotary compression-molding machine according to claim 15, wherein the lower end of the vertically downward wall of the sealing case includes a holding member extending inward, and
 wherein the bottom wall of the sealing case and the holding member interpose an outer edge of the lower punch-retaining portion.

17. The rotary compression-molding machine according to claim 1, wherein the sealing case includes a vertically downward wall that extends vertically downward from a portion outside an outer edge of the lower punch-retaining portion in a downward surface of the bottom wall, and has a lower end positioned lower in level than the upward surface of the lower punch-retaining portion,
 wherein the dust receiver includes the outer wall that rises from the outer edge of the bottom wall, has an upper end positioned higher in level than an sward surface of a circumferential edge of the insertion bore, and includes a returning part projecting inward from the upper end configured to receive and prevent scatter of the powdery material.

18. The rotary compression-molding machine according to claim 17, wherein the lower end of the vertically downward wall of the sealing case includes a holding member extending inward, and
 wherein the bottom wall of the sealing case and the holding member interpose an outer edge of the lower punch-retaining portion.

19. A rotary compression-molding machine, comprising:
 a lower punch-retaining portion disposed below the table, including a retaining bore receiving and retaining a lower punch; and
 a dust-proofing device comprising a sealing case supported by the lower punch-retaining portion and including a bottom wall that includes an insertion bore penetrated by the lower punch, faces an upward surface of the lower punch-retaining portion, and includes a dust receiver disposed outside the insertion bore and configured to capture dust, and an outer wall that rises from an outer edge of the bottom wall, includes an upper end positioned higher in level than an upward surface of a circumferential edge of the insertion bore, and includes a returning part projecting inward from the upper end or a portion adjacent thereto.

20. The rotary compression-molding machine according to claim 19, wherein the dust receiver includes the outer wall of a predetermined length with the returning part projecting inward that is configured to collect the powdery material and inhibit scatter of the powdery material.

* * * * *